(12) United States Patent
Graboske

(10) Patent No.: US 9,031,881 B2
(45) Date of Patent: May 12, 2015

(54) METHOD AND APPARATUS FOR VALIDATING AN APPRAISAL REPORT AND PROVIDING AN APPRAISAL SCORE

(75) Inventor: Benjamin C. Graboske, Santa Ana, CA (US)

(73) Assignee: Corelogic Solutions, LLC, Santa Ana, CA (US)

( * ) Notice: Subject to any disclaimer, the term of this patent is extended or adjusted under 35 U.S.C. 154(b) by 743 days.

(21) Appl. No.: 11/771,114

(22) Filed: Jun. 29, 2007

(65) Prior Publication Data

US 2008/0004893 A1    Jan. 3, 2008

Related U.S. Application Data

(60) Provisional application No. 60/817,881, filed on Jun. 30, 2006.

(51) Int. Cl.
  *G06Q 50/00* (2012.01)
  *G06Q 50/16* (2012.01)
  *G06Q 30/02* (2012.01)

(52) U.S. Cl.
  CPC ............ *G06Q 50/16* (2013.01); *G06Q 30/0278* (2013.01)

(58) Field of Classification Search
  USPC ........................................................... 705/1
  See application file for complete search history.

(56) References Cited

U.S. PATENT DOCUMENTS

| 5,414,621 | A | 5/1995 | Hough |
| 5,696,965 | A | 12/1997 | Dedrick |
| 5,857,174 | A | 1/1999 | Dugan |
| 6,115,694 | A | 9/2000 | Cheetham et al. |
| 6,141,648 | A | 10/2000 | Bonissone et al. |
| 6,178,406 | B1 | 1/2001 | Cheetham et al. |
| 6,609,118 | B1 * | 8/2003 | Khedkar et al. ............ 705/36 R |
| 7,130,810 | B2 | 10/2006 | Foster et al. |
| 7,693,764 | B1 * | 4/2010 | Gordon et al. .................. 705/35 |
| 7,835,919 | B1 * | 11/2010 | Bradley et al. ................. 705/1.1 |
| 2001/0047327 | A1 | 11/2001 | Courtney |
| 2002/0002494 | A1 * | 1/2002 | Beam et al. ..................... 705/20 |
| 2002/0007336 | A1 * | 1/2002 | Robbins ......................... 705/37 |
| 2002/0087389 | A1 * | 7/2002 | Sklarz et al. .................... 705/10 |
| 2002/0095385 | A1 * | 7/2002 | McAvoy et al. ................ 705/51 |
| 2002/0099650 | A1 | 7/2002 | Cole |
| 2002/0133371 | A1 * | 9/2002 | Cole ................................ 705/1 |
| 2003/0046099 | A1 * | 3/2003 | Lamont et al. .................... 705/1 |

(Continued)

OTHER PUBLICATIONS

Rick Grant. (Aug. 2002,). Advances in Collateral Valuation; The appraisal process is the next frontier in the quest to speed up the loan origination process. Technology is taking us there. Mortgage Technology, 9(6), 24-28.*

(Continued)

*Primary Examiner* — Matthew T Sittner
(74) *Attorney, Agent, or Firm* — Oblon, McClelland, Maier & Neustadt, L.L.P.

(57) ABSTRACT

A computer-based method for validating an appraisal report includes receiving appraisal data for a property, receiving property data for the property, verifying the appraisal data meets an appraisal guideline, providing a list of appraisal items that are present in the appraisal data, providing a medium discrepancy amount and a high discrepancy amount for the list of appraisal items, calculating a difference amount between the appraisal data and the property data for each appraisal item, and comparing the difference amount to the medium discrepancy amount and the high discrepancy amount.

15 Claims, 16 Drawing Sheets

(56) References Cited

U.S. PATENT DOCUMENTS

| | | |
|---|---|---|
| 2003/0093366 A1 | 5/2003 | Halper et al. |
| 2003/0212565 A1 | 11/2003 | Badali et al. |
| 2004/0019517 A1 | 1/2004 | Sennott |
| 2004/0138995 A1 | 7/2004 | Hershkowitz et al. |
| 2004/0254803 A1 | 12/2004 | Myr |
| 2005/0108025 A1* | 5/2005 | Cagan ............................... 705/1 |
| 2005/0154656 A1 | 7/2005 | Kim et al. |
| 2005/0154657 A1* | 7/2005 | Kim et al. ....................... 705/30 |
| 2005/0171822 A1 | 8/2005 | Cagan |
| 2005/0216292 A1* | 9/2005 | Ashlock ............................. 705/1 |
| 2005/0288942 A1 | 12/2005 | Graboske et al. |
| 2006/0085207 A1 | 4/2006 | Carey et al. |
| 2006/0085234 A1 | 4/2006 | Cagan |
| 2006/0218005 A1* | 9/2006 | Villena et al. ..................... 705/1 |
| 2006/0224499 A1 | 10/2006 | Graboske et al. |
| 2006/0271472 A1 | 11/2006 | Cagan |
| 2006/0271473 A1 | 11/2006 | Pollock, III et al. |
| 2006/0277141 A1* | 12/2006 | Palmer ............................ 705/38 |
| 2006/0293915 A1 | 12/2006 | Glenn et al. |
| 2007/0033122 A1* | 2/2007 | Cagan ............................. 705/35 |
| 2007/0106523 A1* | 5/2007 | Eaton et al. ....................... 705/1 |
| 2007/0110235 A1* | 5/2007 | Pruitt et al. ..................... 380/54 |
| 2009/0234775 A1* | 9/2009 | Whitney et al. ............. 705/36 R |

OTHER PUBLICATIONS

First American Real Estate Solutions Releases ValuePoint(R)4. (Oct. 21, 2002). PR Newswire,1.*

First American Real Estate Solutions' ValuePoint(R)4 Experiences Explosive Growth in 2004. (Mar. 24, 2005). PR Newswire,1.*

GMAC-RFC Selects First American Real Estate Solutions' ValuePoint(R)4 Automated Valuation Model (AVM). (Jun. 28, 2004). PR Newswire,1.*

First American Real Estate Solutions Experiences Record Response to the Release of ValuePoint(R)4. (Nov. 4, 2002). PR Newswire,1.* www.firstamres.com.* www.RealQuest.com.*

* cited by examiner

COMPLETE APPRAISAL SUMMARY REPORT
UNIFORM RESIDENTIAL APPRAISAL REPORT

Supplemental Valuation Section  
File No. 226519a

| ITEM: | SUBJECT: | COMPARABLE NO. 4 | | COMPARABLE NO. 5 | | COMPARABLE NO. 6 | |
|---|---|---|---|---|---|---|---|
| Address: | 9681 GLACIER STREET MIRAMAR | | | | | | |
| Proximity to Subject | | | | | | | |
| Sales Price | $ N/A | $ | | $ | | $ | |
| Price/Gross Liv. Area | $ 0.00 | $ | | $ | | $ | |
| Data and/or Verification Sources | INSPECTION | | | | | | |
| VALUE ADJUSTMENTS | DESCRIPTION | DESCRIPTION | +(-) $ Adjustment | DESCRIPTION | +(-) $ Adjustment | DESCRIPTION | +(-) $ Adjustment |
| Sales or Financing Concessions | | | | | | | |
| Date of Sale/Time | N/A | | | | | | |
| Location | CORNER | | | | | | |
| Leasehold/Fee Simple | FEE SIMPLE | | | | | | |
| Site | 6393 SF. | | | | | | |
| View | QUIET ST/AVG | | | | | | |
| Design and Appeal | 2-STORY/AVG | | | | | | |
| Quality of Construction | CBS/AVERAGE | | | | | | |
| Age | 1989 | | | | | | |
| Condition | AVERAGE | | | | | | |
| Above Grade Room Count | Total 6 / Bdrms 3 / Baths 2.50 | Total / Bdrms / Baths | | Total / Bdrms / Baths | | Total / Bdrms / Baths | |
| Gross Living Area | 1,858 sq.ft. | Sq.ft. | | Sq.ft. | | Sq.ft. | |
| Basement & Finished Rooms Below Grade | SHINGLE ROOF | | | | | | |
| Functional Utility | AVERAGE | | | | | | |
| Heating/Cooling | CENTRAL A/C | | | | | | |
| Energy Efficient Items | NONE | | | | | | |
| Garage/Carport | 2-C GARAGE | | | | | | |
| Porch, Patio, Deck, Fireplace(s), etc. | SCRN PATIO SCN POOL+SPA | | | | | | |
| Fence, Pool, etc. | WOOD FENCING | | | | | | |
| KITCHEN: | STANDARD | | | | | | |
| Net Adj. (total) | | ☐+ ☐- | 0 | ☐+ ☐- | 0 | ☐+ ☐- | 0 |
| Adjusted Sales Price of Comparable | | Gross: 0.00% Net: 0.00% $ | 0 | Gross: 0.00% Net: 0.00% $ | 0 | Gross: 0.00% Net: 0.00% $ | 0 |

Comments on Sales Comparison (including the subject property's compatibility to the neighborhood, etc.) Listing #1 and #2 are found to be the same model as the subject.

| ITEM: | SUBJECT: | COMPARABLE NO. 4 | COMPARABLE NO. 5 | COMPARABLE NO. 6 |
|---|---|---|---|---|
| Date, Price and Data Source for prior sales within year of appraisal | 8/95 $124,500 ISCNET | | | |

Analysis of any current agreement of sale, option, or listing of the subject property and analysis of any prior sales of subject and comparables within one year of the date of appraisal:

FIG. 2

The First American Corporation

Comparable Analyzer

[ Create Report ]   [ Clear ]

[ Fill grid with test values ]          [ Return to Main Menu ]

Enter Property Information

Appraiser

Name: [        ]                         State: [        ▽]
License #: [        ]

Subject Property

Street Address: [        ]               Gross Living Area (GLA): [        ]
City: [        ]                         Lot Size: [        ]
State: [        ▽]                       Bedrooms: [        ]
Zip Code: [        ]                     Bathrooms: [        ]
Sale Price: [        ]                   Year Built: [        ] YYYY
Sale Date: [        ] MM/DD/YY

Comparable 1

Street Address: [        ]               Gross Living Area (GLA): [        ]
City: [        ]                         Lot Size: [        ]
State: [        ▽]                       Bedrooms: [        ]
Zip Code: [        ]                     Bathrooms: [        ]
Sale Price: [        ]                   Year Built: [        ] YYYY
Sale Date: [        ] MM/DD/YY           Distance From Subject: [        ] mile(s)

[ + Add Another Comparable ]

Copyright © 2006 First American Real Estate Solutions

FIG. 3

The First American Corporation

Comparable Analyzer

[ Create Report ]   [ Clear ]

[ Fill grid with test values ]          [ Return to Main Menu ]

Enter Property Information

Appraiser

| | | | |
|---|---|---|---|
| Name: | Liley Appraisal LLC | State: | Michigan |
| License #: | 123456 | | |

Subject Property

| | | | |
|---|---|---|---|
| Street Address: | 40601 Shellie Lane | Gross Living Area (GLA): | 1330 |
| City: | Hemet | Lot Size: | 1200 |
| State: | California | Bedrooms: | 4 |
| Zip Code: | 92543 | Bathrooms: | 1 |
| Sale Price: | 100000 | Year Built: | 1965  YYYY |
| Sale Date: | 05/02/01  MM/DD/YY | | |

Comparable 1

| | | | |
|---|---|---|---|
| Street Address: | 1176 Val Verde | Gross Living Area (GLA): | 1000 |
| City: | Hemet | Lot Size: | 4600 |
| State: | California | Bedrooms: | 3 |
| Zip Code: | | Bathrooms: | 1 |
| Sale Price: | 200000 | Year Built: | 1966  YYYY |
| Sale Date: | 07/27/05  MM/DD/YY | Distance From Subject: | .48  mile(s) |

[ + Add Another Comparable ]

Copyright © 2006 First American Real Estate Solutions

The First American Corporation

Comparable Analyzer

[ < Previous ]  [ Create New Report ]  [ Save ]  [ Print ]  [ Email ]

[ Return to Main Menu ]

Validation Report                                                          Report ID:
6301126519254340601

FAIL!
17 discrepancies were found (15 high, 2 medium).

Appraiser
Name:          Liley Appraisal LLC
License #:     123456
State:         MI
Tolerances

| Field | Medium Tolerance | High Tolerance | Field | Medium Tolerance | High Tolerance |
|---|---|---|---|---|---|
| Sale Price: | 1% | 3% | Bedrooms: | 0 | 1 |
| Sale Date: | 1 month(s) | 2 month(s) | Bathrooms: | 0 | 1 |
| Gross Living Area: | 1% | 3% | Year Built: | 1 year(s) | 3 year(s) |
| Lot Size: | 1% | 3% | Distance From Subject: | 0.10 mile(s) | 0.30 mile(s) |

☆ Subject Property

| Field | Provided | Public Record | Difference | Diff% | Severity |
|---|---|---|---|---|---|
| Address | 40601 Shellie Lane, Hemet, CA, 9254340601 | SHELLIE, HEMET, CA, 92544 | | | |
| Sale Price | 100,000 | 99,000 | 1000 | 1% | Medium |
| Sale Date | 05/02/01 | 01/30/01 | 4 | % | High |
| GLA | 1,330 | 1,332 | -2 | 0% | |
| Lot Size | 12,000 | 10,018 | 1982 | 20% | High |
| Bedrooms | 4 | 4 | 0 | 0% | |
| Bathrooms | 1 | 2 | -1 | 50% | High |
| Year Built | 1965 | 1965 | 0 | 0% | |
| Tax Assessed Value 107,017 | | | | | |

⊙ Comparable 1

| Field | Provided | Public Record | Difference | Diff% | Severity | Sub Diff | Sub Diff% |
|---|---|---|---|---|---|---|---|
| Address | 1176 Val Verde, Hemet, CA, | 1176 VAL VERDE, HEMET, CA, 92543 | | | | | |
| Sale Price | 200,000 | 200,000 | 0 | 0% | | | |
| Sale Date | 07/27/05 | 04/12/05 | 3 | % | High | | |
| GLA | 1,000 | 1,362 | -362 | 27% | High | -30 | 2% |
| Lot Size | 4,600 | 6,969 | -2369 | 34% | High | 3049 | 44% |
| Bedrooms | 3 | 2 | 1 | 50% | High | 2 | 100% |
| Bathrooms | 1 | 2 | -1 | 50% | High | 0 | 0% |
| Year Built | 1966 | 1964 | 2 | 0% | Medium | 1 | 0% |
| Distance | .48 | 0.47 | 0.01 | 2% | | | |
| Tax Assessed Value 86,001 | | | | | | | |

⊙ Comparable 2

| Field | Provided | Public Record | Difference | Diff% | Severity | Sub Diff | Sub Diff% |
|---|---|---|---|---|---|---|---|
| Address | 40171 Stetson,,, 92543 | 40171 STETSON, HEMET, CA, 92543 | | | | | |

FIG. 8A

| Sale Price | 249,100 | 220,000 | 29100 | 13% | High | | |
|---|---|---|---|---|---|---|---|
| Sale Date | 09/01/05 | 09/22/05 | | % | | | |
| GLA | 1,020 | 792 | 228 | 29% | High | 540 | 68% |
| Lot Size | 8,900 | 7,840 | 1060 | 14% | High | 2178 | 28% |
| Bedrooms | 2 | 2 | 0 | 0% | | 2 | 100% |
| Bathrooms | 2 | 1 | 1 | 100% | High | 1 | 100% |
| Year Built | 1964 | 1964 | 0 | 0% | | 1 | 0% |
| Distance | .42 | 0.43 | -0.01 | 2% | | | |
| Tax Assessed Value | 66,735 | | | | | | |

◉ Comparable 3

| Field | Provided | Public Record | Difference | Diff% | Severity | Sub Diff | Sub Diff% |
|---|---|---|---|---|---|---|---|
| Address | 26894 Yale, Hemet, CA, 92543 | 26894 YALE, HEMET, CA, 92544 | | | | | |
| Sale Price | 240,000 | 285,000 | -45000 | 16% | High | | |
| Sale Date | 06/21/05 | 05/25/05 | 1 | % | | | |
| GLA | 1,180 | 1,184 | -4 | 0% | | 148 | 13% |
| Lot Size | 7,400 | 7,405 | -5 | 0% | | 2613 | 35% |
| Bedrooms | 2 | 3 | -1 | 33% | High | 1 | 33% |
| Bathrooms | 1 | 1 | 0 | 0% | | 1 | 100% |
| Year Built | 1761 | 1961 | -200 | 10% | High | 4 | 0% |
| Distance | .1 | 0.18 | -0.08 | 44% | | | |
| Tax Assessed Value | 219,300 | | | | | | |

◪ Comp. Analyzer's Top Comparables

| Rank | Used | Type | Address | Sale Price | Sale Date | GLA | Lot Size | Bed | Bath | Built | Distance |
|---|---|---|---|---|---|---|---|---|---|---|---|
| 1 | | Sale | 40855 BOYER, HEMET, CA, 92544 | 310,000 | 05/08/06 | 1,200 | 8,276 | 3 | 2.0 | 1974 | 0.49 |
| 2 | | Sale | 40668 MULBERRY, HEMET, CA, 92544 | 307,000 | 03/03/06 | 1,312 | 6,969 | 3 | 2.0 | 1976 | 0.17 |
| 3 | | Sale | 1141 LESLIE, HEMET, CA, 92543 | 309,000 | 02/17/06 | 1,204 | 6,534 | 3 | 2.0 | 1965 | 0.53 |
| 4 | | Sale | 1261 E WHITTIER, HEMET, CA, 92543 | 295,000 | 02/07/06 | 1,490 | 6,098 | 2 | 2.0 | 1968 | 0.51 |
| 5 | | Sale | 40620 JOHNSTON, HEMET, CA, 92544 | 297,000 | 05/08/06 | 1,292 | 8,712 | 2 | 0.0 | 1957 | 0.12 |
| 6 | | Sale | 40621 WHITTIER, HEMET, CA, 92544 | 295,000 | 11/08/05 | 1,086 | 7,405 | 3 | 2.0 | 1964 | 0.35 |

FIG. 8B

The First American Corporation
Comparable Validator

[ Create Report ]   [ Clear ]

Gross Living Area (GLA): [ 5 ] %      Year Built: [ Select ▽ ]
Lot Size: [ 5 ] %                     Distance From Subject: [ 1 ] mile(s)

Subject Property

| | | | |
|---|---|---|---|
| Street Address: | [          ] | Gross Living Area (GLA): | [     ] |
| City: | [          ] | Lot Size: | [     ] |
| State: | [        ▽ ] | Bedrooms: | [     ] |
| Zip Code: | [          ] | Bathrooms: | [     ] |
| Sale Price: | [          ] | Year Built: | [     ] YYYY |
| Sale Date: | [       ] MM/DD/YY | | |

Comparable

Type:   ● Sale   ○ Listing

| | | | |
|---|---|---|---|
| | | Gross Living Area (GLA): | [     ] |
| Street Address: | [          ] | Lot Size: | [     ] |
| City: | [          ] | Bedrooms: | [     ] |
| State: | [        ▽ ] | Bathrooms: | [     ] |
| Zip Code: | [          ] | Year Built: | [     ] YYYY |
| Sale Price: | [          ] | Distance From Subject: | [     ] mile(s) |
| Sale Date: | [       ] MM/DD/YY | | |

[ + Add Another Comparable ]

[ Create Report ]   [ Clear ]

About Us | Contact Us | Privacy Policy | Terms of Use
© 2006 First American Real Estate Solutions

FIG. 10B

The First American Corporation
Comparable Validator

[<<Previous] [Create New Report] [Save] [Print] [Email]

Validation Report
10 discrepancies were found (9 high, 1 medium, 0 low).

| Appraiser | |
|---|---|
| Name: | Person's Name |
| License #: | 8907698 |
| State: | California |

| Tolerance | | | |
|---|---|---|---|
| Sale Price: | 5% | Bedrooms: | N/A |
| Sale Date: | 12 months | Bathrooms: | N/A |
| Gross Living Area: | 5% | Year Built: | N/A |
| Lot Size: | 5% | Distance From Subject: | 1 mile |

Subject Property

| Field | Provided | Public Record | Difference | Diff % | Severity |
|---|---|---|---|---|---|
| Address: | 1234 Main Street, Los Angeles, Ca, 90012 | 1234 Main Street, Los Angeles, CA, 90012 | | | |
| Sale Price: | $885,000 | $885,000 | | | |
| Sale Date: | 12/14/05 | 12/14/05 | | | |
| GLA: | 3,100 | 2,728 | 372 | 12% | High |
| Lot Size: | 7,000 | 5,740 | 1,260 | 19% | High |
| Bedrooms: | N/A | 3 | 3 | | High |
| Bathrooms: | 2.5 | 2.5 | | | |
| Year Built: | 2000 | 1984 | 6 | | Medium |

Comparable 1

| Field | Provided | Public Record | Difference | Diff % | Severity |
|---|---|---|---|---|---|
| Type: | Sale | Sale | | | |
| Address: | 12 Maple Lane, Los Angeles, Ca, 90012 | 12 Maple Lane, Los Angeles, CA, 90012 | | | |
| Sale Price: | $900,010 | $900,010 | | | |
| Sale Date: | 12/14/05 | 12/14/05 | | | |
| GLA: | 2,850 | 2,508 | 342 | 12% | High |
| Lot Size: | 6,000 | 4,920 | 1,080 | 18% | High |
| Bedrooms: | 3 | 3 | | | |
| Bathrooms: | 2.5 | 2.5 | | | |
| Year Built: | 2000 | 2000 | | | |
| Distance: | 1 mile | 1 mile | | | |

FIG. 11A

The First American Corporation

Comparable Validator

[ < Previous ] [ Create New Report ] [ Save ] [ Print ] [ Email ]

Comparable 2

| Field | Provided | Public Record | Difference | Diff % | Severity |
|---|---|---|---|---|---|
| Type: | Sale | Sale | | | |
| Address: | 12 Maple Lane, Los Angeles,Ca,90012 | 12 Maple Lane, Los Angeles,Ca,90012 | | | |
| Sale Price: | $900,010 | $900,010 | | | |
| Sale Date: | 12/14/05 | 12/14/05 | | | |
| GLA: | 2,850 | 2,508 | 342 | 12% | High |
| Lot Size: | 8,000 | 4,920 | 1,080 | 18% | High |
| Bedrooms: | 3 | 3 | | | |
| Bathrooms: | 2.5 | 2.5 | | | |
| Year Built: | 2000 | 2000 | | | |
| Distance: | 1 mile | 1 mile | | | |

Comparable 3

| Field | Provided | Public Record | Difference | Diff % | Severity |
|---|---|---|---|---|---|
| Type: | Sale | Sale | | | |
| Address: | 12 Maple Lane, Los Angeles,Ca,90012 | 12 Maple Lane, Los Angeles,Ca,90012 | | | |
| Sale Price: | $900,010 | $900,010 | | | |
| Sale Date: | 12/14/05 | 12/14/05 | | | |
| GLA: | 2,850 | 2,508 | 342 | 12% | High |
| Lot Size: | 6,000 | 4,920 | 1,080 | 18% | High |
| Bedrooms: | 3 | 3 | | | |
| Bathrooms: | 2.5 | 2.5 | | | |
| Year Built: | 2000 | 2000 | | | |
| Distance: | 1 mile | 1 mile | | | |

Analyzer's Top Comparables

| Rank | Used | Type | Address | Sale Price | Sale Date | GLA | Lot Size | Bed | Bath | Built | Distance |
|---|---|---|---|---|---|---|---|---|---|---|---|
| 1 | | Sale | 12 Maple Lane, Los Angeles,CA,90012 | $900,010 | 12/14/05 | 2,508 | 4,920 | 3 | 2.5 | 2000 | 1 |
| 2 | Yes | Sale | 12 Maple Lane, Los Angeles,CA,90012 | $900,010 | 12/14/05 | 2,508 | 4,920 | 3 | 2.5 | 2000 | 1 |
| 3 | | Sale | 12 Maple Lane, Los Angeles,CA,90012 | $900,010 | 12/14/05 | 2,508 | 4,920 | 3 | 2.5 | 2000 | 1 |
| 4 | Yes | Sale | 12 Maple Lane, Los Angeles,CA,90012 | $900,010 | 12/14/05 | 2,508 | 4,920 | 3 | 2.5 | 2000 | 1 |
| 5 | | Sale | 12 Maple Lane, Los Angeles,CA,90012 | $900,010 | 12/14/05 | 2,508 | 4,920 | 3 | 2.5 | 2000 | 1 |
| 6 | | Sale | 12 Maple Lane, Los Angeles,CA,90012 | $900,010 | 12/14/05 | 2,508 | 4,920 | 3 | 2.5 | 2000 | 1 |
| 7 | | Sale | 12 Maple Lane, Los Angeles,CA,90012 | $900,010 | 12/14/05 | 2,508 | 4,920 | 3 | 2.5 | 2000 | 1 |
| 8 | | Sale | 12 Maple Lane, Los Angeles,CA,90012 | $900,010 | 12/14/05 | 2,508 | 4,920 | 3 | 2.5 | 2000 | 1 |
| 9 | Yes | Sale | 12 Maple Lane, Los Angeles,CA,90012 | $900,010 | 12/14/05 | 2,508 | 4,920 | 3 | 2.5 | 2000 | 1 |
| 10 | | Sale | 12 Maple Lane, Los Angeles,CA,90012 | $900,010 | 12/14/05 | 2,508 | 4,920 | 3 | 2.5 | 2000 | 1 |

Map

FIG. 11B

METHOD AND APPARATUS FOR VALIDATING AN APPRAISAL REPORT AND PROVIDING AN APPRAISAL SCORE

CLAIM OF PRIORITY UNDER 35 U.S.C. §119

The present Application for Patent claims priority to Provisional Application No. 60/817,881, entitled "Appraisal Validation System and Method," filed on Jun. 30, 2006, and assigned to the assignee hereof and hereby expressly incorporated by reference herein.

BACKGROUND

1. Field

The invention relates to appraisal reports and scores. More particularly, the invention relates to a method and apparatus for validating an appraisal report and providing an appraisal score.

2. Related Art

Generally, an appraiser attempts to judge the value of a given real estate property using a variety of objective and subjective characteristics of the property. Some exemplary objective characteristics may include without limitation the location of the property, the size of the property, and the square footage of any structures on the property. A typical appraisal involves selecting recently-sold properties having characteristics similar to those of the subject property and using the recent sales prices of these "comparable" properties to set a value for the subject property.

The appraiser may write down the appraisal data for the objective characteristics of the property on an appraisal form. The appraiser may accidentally or intentionally write down incorrect appraisal data on the appraisal form. For example, the appraiser may try to increase the appraised value of the subject property by writing down an additional bathroom or bedroom or increasing the square footage. If a portion of the appraisal data is incorrect, the appraisal value of the subject property and the selected comparable properties may be inaccurate or incorrect. Obtaining reliable appraisal data is important to valuing a property and determining comparable properties. In addition, the appraisal of a property can vary dramatically among different appraisers and even with the same appraiser on different days. Furthermore, existing approaches have been ineffective in automating the appraisal process so that clients can identify discrepancies in appraisal reports and flag failed appraisal reports.

SUMMARY

A machine-readable medium for validating an appraisal report comprising instructions that upon execution cause a machine to receive appraisal data for a property, receive property data for the property, verify the appraisal data meets an appraisal guideline, provide a list of appraisal items that are present in the appraisal data, provide a medium discrepancy amount and a high discrepancy amount for the list of appraisal items, calculate a difference amount between the appraisal data and the property data for each appraisal item, and compare the difference amount to the medium discrepancy amount and the high discrepancy amount.

A computer-based method for validating an appraisal report comprising receiving appraisal data for a property, receiving property data for the property, verifying the appraisal data meets an appraisal guideline, providing a list of appraisal items that are present in the appraisal data, providing a medium discrepancy amount and a high discrepancy amount for the list of appraisal items, calculating a difference amount between the appraisal data and the property data for each appraisal item, and comparing the difference amount to the medium discrepancy amount and the high discrepancy amount.

BRIEF DESCRIPTION OF THE DRAWINGS

The features, objects, and advantages of the invention will become more apparent from the detailed description set forth below when taken in conjunction with the drawings, wherein:

FIG. 2 is a residential property appraisal form that is completed by an appraiser according to an embodiment of the invention.

FIG. 3 is a blank graphical user interface that shows the different input fields for the appraisal data that the appraiser fills in for the subject property and comparable property 1 according to an embodiment of the invention.

FIG. 4 is a graphical user interface showing exemplary appraisal data filled into the different input fields for the subject property and comparable property 1 according to an embodiment of the invention.

Figure 6:
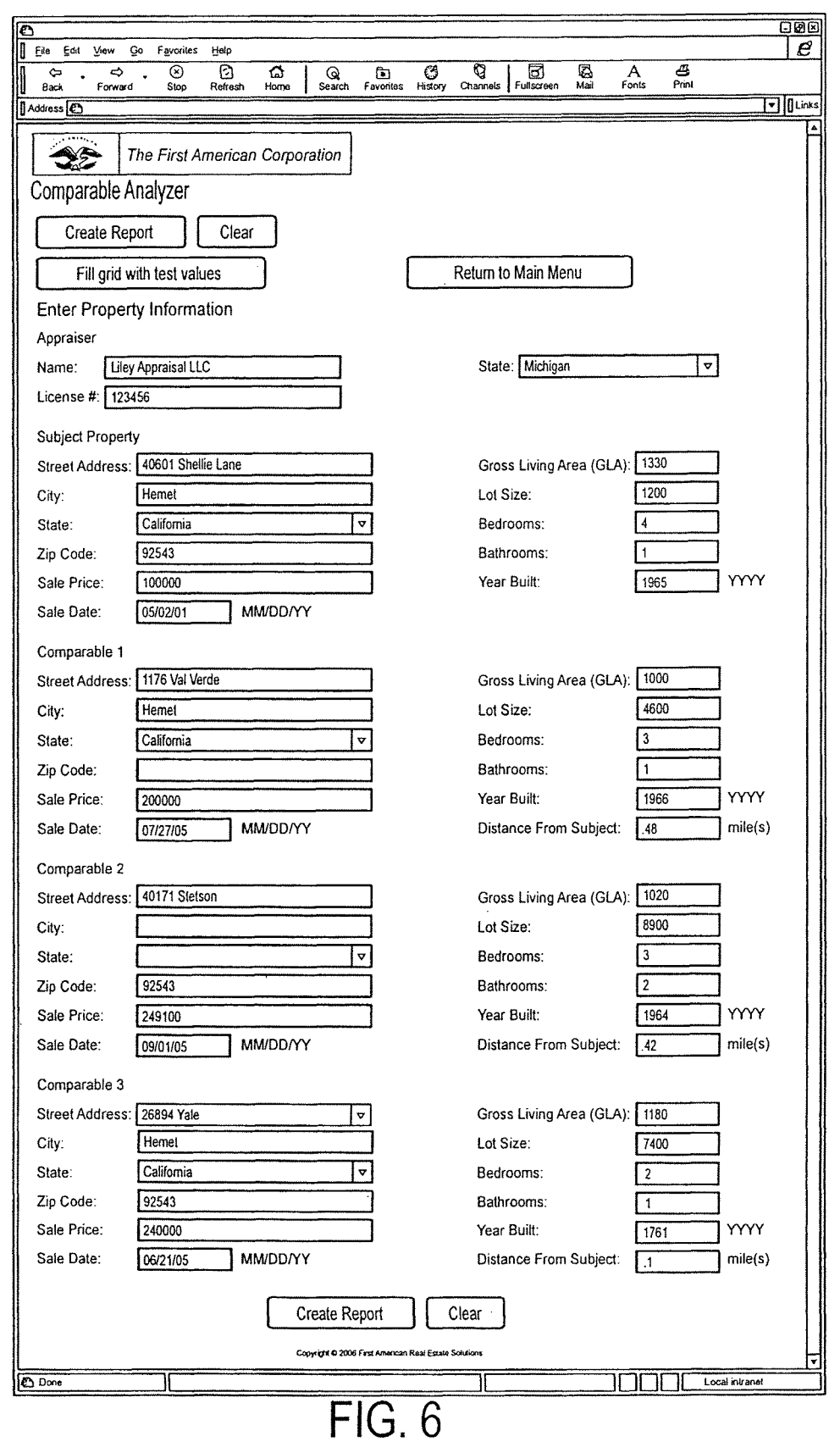

FIG. 6 is a graphical user interface showing exemplary appraisal data filled into the different input fields for the subject property, comparable property 1, comparable property 2 and comparable property 3 according to an embodiment of the invention.

FIGS. 8A and 8B are exemplary discrepancy reports using exemplary appraisal data and exemplary property data according to an embodiment of the invention.

FIGS. 10A and 10B are graphical user interfaces used by a client to input the appraisal data from the appraisal report and select the discrepancy amounts for some of the items listed on the appraisal report according to an embodiment of the invention.

FIGS. 11A and 11B are exemplary discrepancy reports using exemplary appraisal data and exemplary property data according to an embodiment of the invention.

DETAILED DESCRIPTION

Methods and systems that implement the embodiments of the various features of the invention will now be described with reference to the drawings. The drawings and the associated descriptions are provided to illustrate embodiments of the invention and not to limit the scope of the invention. Reference in the specification to "one embodiment" or "an embodiment" is intended to indicate that a particular feature, structure, or characteristic described in connection with the embodiment is included in at least an embodiment of the invention. The appearances of the phrase "in one embodiment" or "an embodiment" in various places in the specification are not necessarily all referring to the same embodiment. Throughout the drawings, reference numbers are re-used to indicate correspondence between referenced elements. In addition, the first digit of each reference number indicates the figure in which the element first appears.

Figure 1:
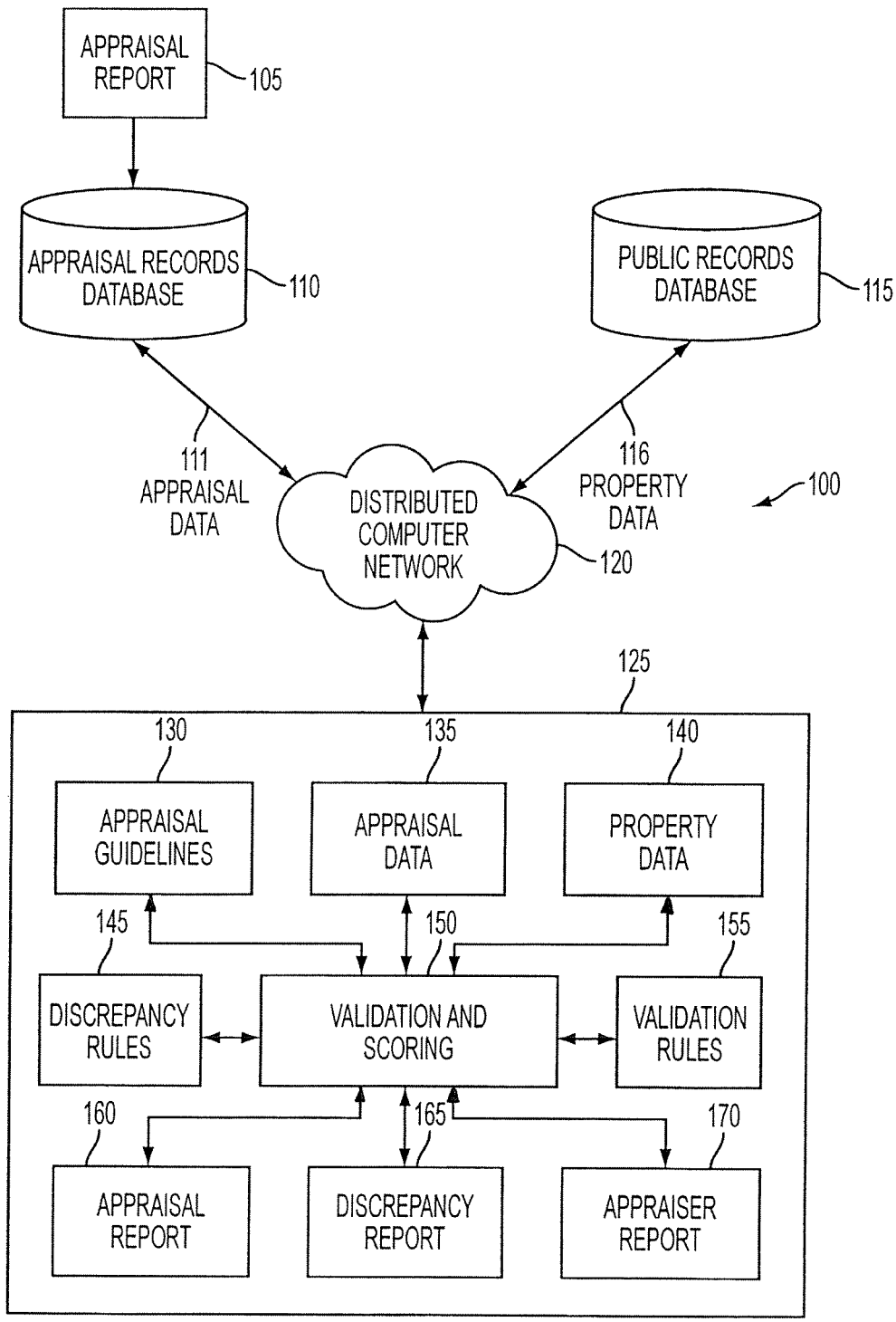
FIG. 1 is a block diagram of an appraisal validation system according to an embodiment of the invention.
Figure 5:
FIG. 5 is a graphical user interface showing exemplary appraisal data filled into the different input fields for the subject property, comparable property 1 and comparable property 2 according to an embodiment of the invention.

FIG. 1 is a block diagram of an appraisal validation system 100 according to an embodiment of the invention. The appraisal validation system 100 may include one or more appraisal reports 105, an appraisal records database 110, a public records database 115, a distributed computer network 120, and a processing module 125.

The appraisal report 105 may be an appraisal form such as a Uniform Residential Appraisal Report as shown in FIG. 2. The appraisal report 105 may be manually completed by an appraiser using the appraisal form shown in FIG. 2 or electronically completed by an appraiser using the graphical user interfaces shown in FIGS. 3-6. Referring to FIG. 2, the appraiser may write the appraisal data 111 on the appraisal form. The appraisal form may be scanned in as a TIFF, JPEG, BMP, XML, PDF or 1004 structured file format and may be sent to the appraisal records database 110 via email, html upload, ftp and/or xml. The appraisal records database 110 may use OCR and/or ICR to extract the appraisal data 111 from the appraisal form and/or may convert the appraisal data 111 into a consistent, structured file format. A user may also manually input the appraisal data 111 into the graphical user interfaces and then the appraisal data 111 is received by the appraisal records database 110.

FIG. 3 is a blank graphical user interface that shows the different input fields for the appraisal data 111 that the appraiser fills in for the subject property according to an embodiment of the invention. FIG. 4 is a graphical user interface showing exemplary appraisal data 111 filled into the different input fields for the subject property according to an embodiment of the invention. The appraiser may use a hand-held device (e.g., iPhone, BlackBerry, etc.) or other processing device to access a graphical user interface to input the appraisal data 111 (1305). The appraisal data 111 may include an appraiser's name, license number and state of the license. The appraisal data 111 may also include an address, a sale price, a sale date, a location, a type of leasehold, a lot size, a home size (i.e., gross living area), a view, a design and appeal, a quality of construction, an age or year built, a condition, a bedroom count, a bathroom count, a roof type, a functional utility, a heating/cooling type, energy efficient items, a number of garages, and an amenities list of the property.

The appraiser may provide the appraisal data 111 for one or more comparable properties (e.g., Comparable No. 1, Comparable No. 2 and Comparable No. 3) as shown in FIG. 2. The appraiser may select Add Another Comparable (FIG. 3), which causes FIG. 4 to be displayed and allows the appraiser to input appraisal data 111 for comparable property 1. The appraiser may select Add Another Comparable (FIG. 4), which causes FIG. 5 to be displayed and allows the appraiser to input appraisal data 111 for comparable property 2. The appraiser may select Add Another Comparable (FIG. 5), which causes FIG. 6 to be displayed and allows the appraiser to input appraisal data 111 for comparable property 3. More than 3 comparable properties can be added using similar graphical user interfaces.

Referring to FIG. 1, the appraisal records database 110 stores the appraisal data 111 received from the appraisal report 105 or the appraiser. The appraisal records database 110 stores the appraisal data 111 for each property as a separate record. The appraiser may determine or input the appraisal data 111 for a number of properties that are considered comparable to the subject property and may transmit the appraisal data 111 to the appraisal records database 110. The appraisal records database 110 can be any type of storage device.

The public records database 115 stores property data 116 received from a third party provider such as First American Corporation or a county or city office (1310). The public records database 115 stores the property data 116 for each property as a separate record. The property data 116 may include details about the subject property and the comparable properties. The property data 116 for each property may include an address, a sale price, a sale date, a location, a type of leasehold, a lot size, a home size (i.e., gross living area), a view, a design and appeal, a quality of construction, an age or year built, a condition, a bedroom count, a bathroom count, a roof type, a functional utility, a heating/cooling type, energy efficient items, a number of garages, and an amenities list of the property. The public records database 115 can be any type of storage device.

The appraisal records database 110 and the public records database 115 may be coupled via a wireless or wired link to a distributed computer network 120. The distributed computer network 120 can be the Internet or other network capable of receiving and transmitting data. The distributed computer network 120 can be a private or a public network. The distributed computer network 120 may be coupled via a wireless or wired link to a processing module 125. In one embodiment, the appraisal records database 110 and the public records database 115 are coupled between the distributed computer network 120 and the processing module 125.

The processing module 125 may be a processor, a controller or other device capable of comparing, extracting, processing, retrieving, transmitting, and validating data. The processing module 125 may include an appraisal guidelines module 130, an appraisal data module 135, a property data module 140, a discrepancy rules module 145, a validation and scoring module 150, a validation rules module 155, an appraisal report module 160, a discrepancy report module 165, and an appraiser report module 170. All the modules may be implemented using software, hardware, and combinations thereof.

The appraisal guidelines module 130 includes appraisal guidelines such as the Uniform Standards of Professional Appraisal Practice (USPAP) appraisal guidelines. The USPAP are the established requirements for professional appraisal practice, which may include the minimum foundation for the development of an appraisal and the reporting of the results. In addition, statistical perspectives are important to the accurate interpretation of data and the development of assumptions made to reach a value conclusion. The appraisal guidelines may include a list of guidelines that should be met for the appraisal report 105. The appraisal guidelines module 130 may verify that the appraisal data 111 meets appraisal guidelines (1315).

The appraisal data module 135 includes the appraisal data 111 for the subject property and all comparable properties.

The public records data module 140 includes the property data 116 for the subject property and all comparable properties.

Figure 7:
FIG. 7 is a graphical user interface that allows a client to set discrepancy rules that define acceptable and unacceptable severity levels based on any discrepancy between the supplied appraisal data from the appraiser and the property data from the public records database according to an embodiment of the invention.

The discrepancy rules module 145 allows clients to establish client-by-client discrepancy rules (exemplary discrepancy rules shown in FIG. 7) that define acceptable and unacceptable severity levels based on any discrepancies between the supplied appraisal data 111 from the appraiser and the property data 116 from the public records database 115. Hence, the discrepancy rules module 145 can detect appraisal fraud if the number of medium and/or high severities is greater than a specified amount. The discrepancy rules module 145 may display a graphical user interface as shown in FIG. 7 to allow clients to set their risk management and discrepancy rules that fit well with their overall risk tolerance and operational guidelines. Using the discrepancy rules module 145, the client may provide a list of appraisal items and one or more discrepancy amounts or rules for each appraisal item in the list (1320, 1325). For example, the client may provide a medium discrepancy amount (1) and a high discrepancy amount (3) for the gross living area (see FIG. 7). The appraisal items may include a sale price, a sale date, a gross living area, a lot size, a number of bedrooms, a number of bathrooms, a year built, and a distance from the subject property. A discrepancy rule can be set for each appraisal item listed on the appraisal report 105. For example, the client may set discrepancy rules for the sale price at 1% greater than public records for medium severity and at 3% greater than public records for high severity. The client may input a medium severity discrepancy amount and a high severity discrepancy amount for each appraisal item listed on the appraisal report 105.

In addition, the client may receive one or more validation rules. The validation rules may include (1) there is an undisclosed sale on the subject or a comparable, (2) there are 1 or more high severity differences between user-provided data and the public records data, (3) there are 2 or more medium severity differences between user-provided data and the public record data, (4) the appraiser's license is not current or broker's license associated with the appraiser is not current, and (5) the appraiser has not signed the appraisal form (validation of signature or presence of signature) (1330). The client may set a fail flag for one or more validation rules (1335). A set fail flag indicates that if the condition is met, the client will receive a fail notice indicating that the appraisal data 111 meets the condition set by the validation rule (1370, 1375). If a fail flag is set for a validation rule and the validation rule is met, the validation rules module 155 transmits a failed condition to the validation and scoring module 150. The client may create the validation rules based on the client's needs.

The validation and scoring module 150 may receive the appraisal guidelines to ensure that the appraisal data 111 meets or exceeds the appraisal guidelines. For example, the validation and scoring module 150 may ensure that the appraisal report 105 includes all the required information in the correct format and no necessary fields have been left blank. The validation and scoring module 150 may extract the appraisal data 111 from the appraisal report 105 or receive the appraisal data 111 from the appraisal records database 110, receive the property data 116 from the property records database 115 or the property data module 140 and compare the appraisal data 111 to the property data 116 to determine whether the appraisal data 111 is within a discrepancy amount of the property data 116 (1340). The validation and scoring module 150 may determine whether each item of the appraisal data 111 is within a discrepancy amount of each corresponding item of the property data 116 and if so, validates each item of the appraisal data 111, and if not, determine the severity level using the set discrepancy amounts or rules (1345, 1350, 1355, 1360, 1365). The validation and scoring module 150 may use the appraisal guidelines, the discrepancy rules and/or the validation rules to validate the veracity of the appraisal data 111 (i.e., the content in the appraisal form including the subject property and the comparables).

The validation and scoring module 150 may also determine the accuracy of the data provided by the appraiser for the comparable properties. For example, the validation and scoring module 150 may determine the distance from each comparable to the subject property, whether the distance falls within a proper guideline to be considered a comparable property, whether any obstacles or blights such as railroad tracks or freeways exist near or between the subject property and any of the comparable properties, whether the comparable is within the same subdivision or within the same census tract as the subject property, whether the comparable property is an accurate comparable to the subject property, whether the property data includes other comparable properties that are more comparable (i.e., a property that would adversely affect the valuation) than the comparable properties identified by the appraiser, and compare the sale prices of the comparable properties to the sale price of the subject property and validate that the sale prices of the comparable properties are within a certain percentage (e.g., 10%) of the sale price of the subject property. Using the property data 116 for the subject property, the validation and scoring module 150 retrieves other comparable properties from the public records database 115. The other comparable properties may be selected based on one or more of the following: a sale price, a sale date, a gross living area, a lot size, a number of bedrooms, a number of bathrooms, a year built, a distance from the subject property, obstacles or blights such as railroad tracks or freeways near the subject property and/or the comparable property, and the comparable property is within the same subdivision or within the same census tract as the subject property.

The validation and scoring module 150 may also track usage and audit trails for compliance, apply USPAP and Federal National Mortgage Association (FNMA) appraisal validation rules to the appraisal data 111 and to check the range of values in the neighborhood in the past 12 months, for example, and what is the variance outside the range.

The appraisal report module 160 provides detailed information about the subject property and any comparable properties as provided by the appraiser. The discrepancy report module 165 generates and provides the discrepancy report to the client.

The appraiser report module 170 generates and provides a list of appraisers and lists the number of medium severity, high severity and failed appraisal reports associated with each particular appraiser. The medium severity may be weighted less than the high severity. The high severity may be weighted less than the failed appraisal reports. Each appraiser may be assigned an appraisal score from for example 1 to 1000 based on the number of medium severity, high severity and failed appraisal reports. The higher score may indicate a better appraisal having a lower number of medium severity, high severity and failed appraisal reports.

The appraiser reports may be organized in a number of ways. For example, each appraiser report may list the appraiser's name and license number, an appraisal score and a turn time (i.e., the number of days it takes the appraiser to complete the appraisal) for each appraisal performed by the particular appraiser, an aggregate appraisal score and an average appraisal score based on their entire portfolio of appraisal scores. In addition, the list may include an indicator (e.g., default, repurchase, etc.) and a number of the appraiser's properties that have moved into a default or repurchase state.

The appraisal report can sort the appraisers based on one or more of the following: aggregate appraisal score, average appraisal score, default number or rate, repurchase number or rate, and average turn time. The appraisal records database 110 can store the appraiser reports information.

FIGS. 8A and 8B are exemplary discrepancy reports using exemplary appraisal data 111 and exemplary property data 116 according to an embodiment of the invention. The discrepancy report module 165 outputs a discrepancy report, which lists the appraisal items, the number of medium severity discrepancies and the number of high severity discrepancies (1380). The discrepancy report shows a discrepancy amount, a discrepancy percentage, and a severity level between the appraisal data 111 and the property data 116 for each discrepancy rule and/or for each validation rule. The discrepancy report is provided for the subject property and any comparable properties identified by the appraiser. In addition, the discrepancy report provides other comparable properties identified by the validation and scoring module 150 (shown in FIG. 8b as Analyzer's Top Comparables). The discrepancy report can be provided in Word, HTML or batch file format. The discrepancy may color-code all the discrepancies based on severity.

Figure 9:
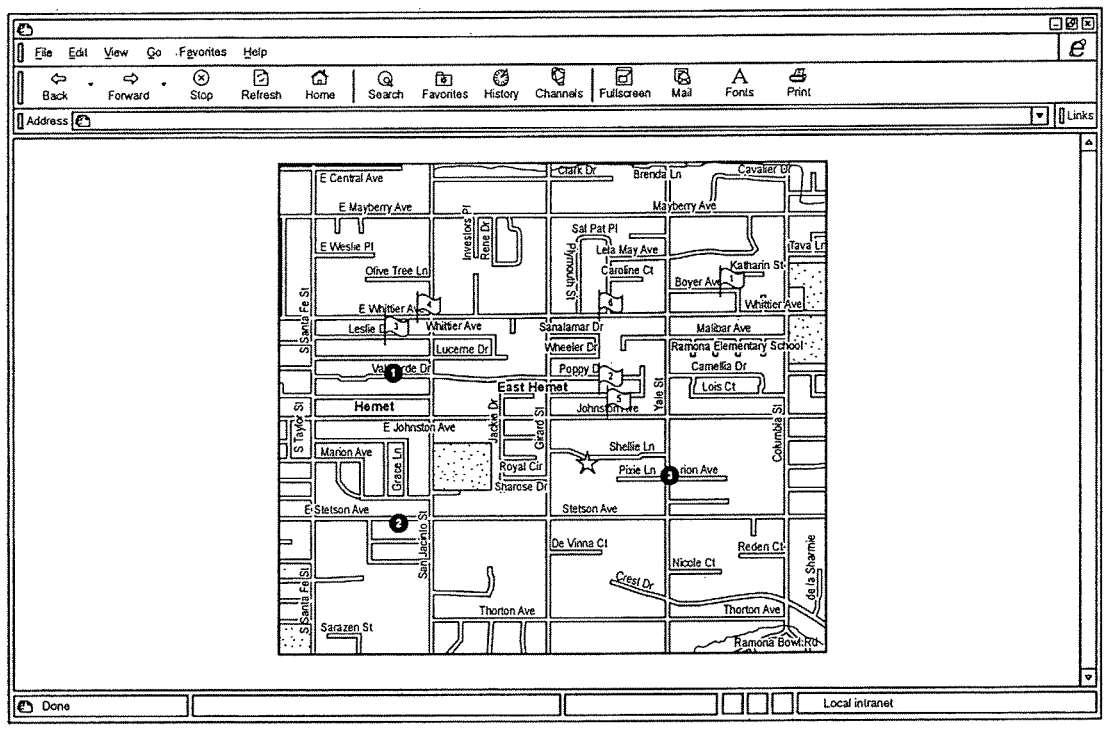
FIG. 9 is a map of the results identifying the subject property, the comparables from the appraiser, and the comparables from the validation and scoring module according to an embodiment of the invention.

FIG. 9 is a map of the results identifying the subject property, the comparables from the appraiser, and the comparables from the validation and scoring module 150 according to an embodiment of the invention (1380). For example, the subject property is shown using a star, the comparables from the appraiser is shown using circles, and the comparables from the validation and scoring module 150 is shown using flags. The map feature allows an appraisal reviewer to determine subjectively if the comparables provided by the appraiser appear to be the best comparables for the subject property.

Figure 10A:
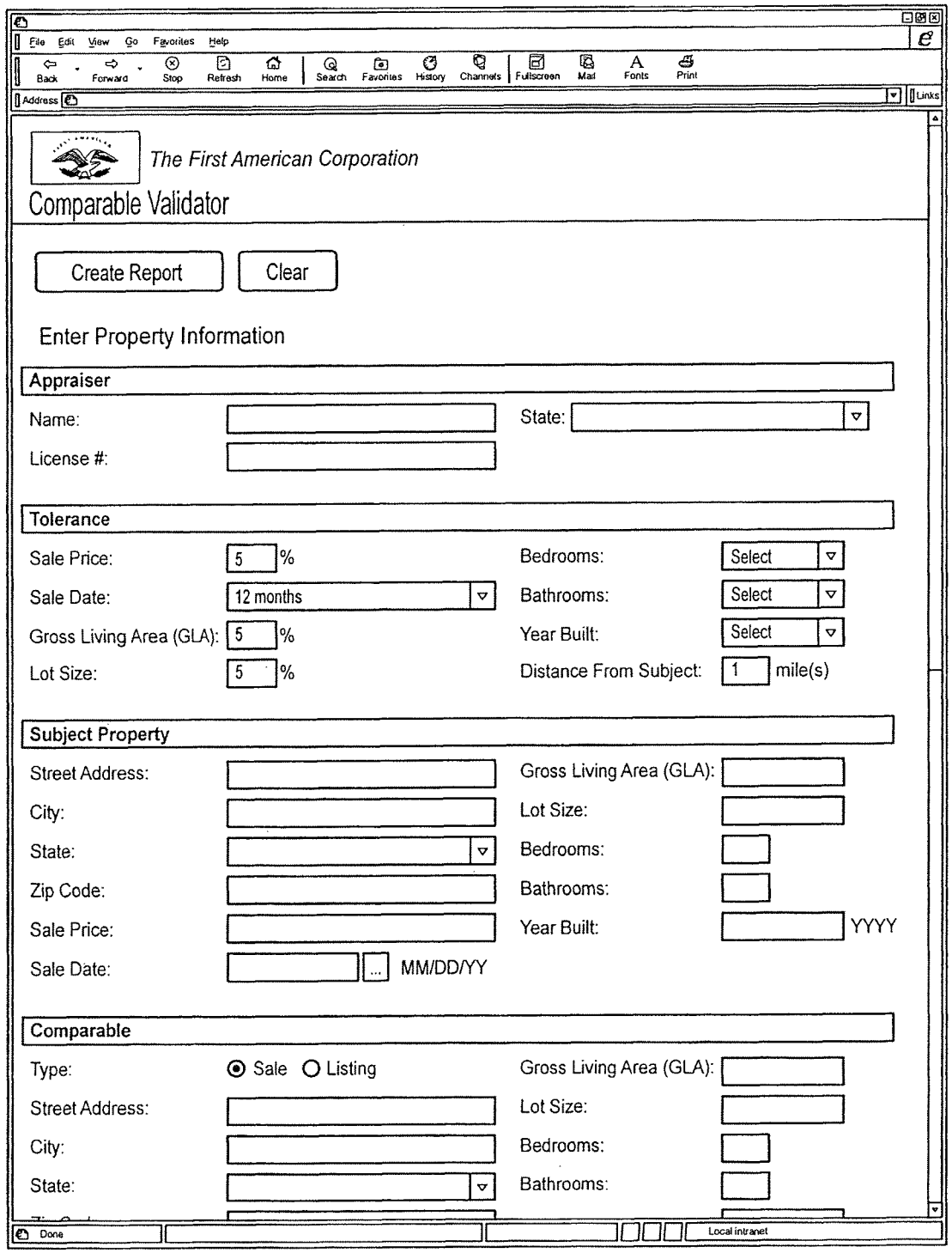

FIGS. 10A and 10B are graphical user interfaces used by a client to input the appraisal data 111 from the appraisal report 105 and select the discrepancy amounts for some of the appraisal items listed on the appraisal report 105 according to an embodiment of the invention. The graphical user interfaces may be automatically filled in by the processing module 125.

FIGS. 11A and 11B are exemplary discrepancy reports using exemplary appraisal data and exemplary property data according to an embodiment of the invention.

Figure 12:
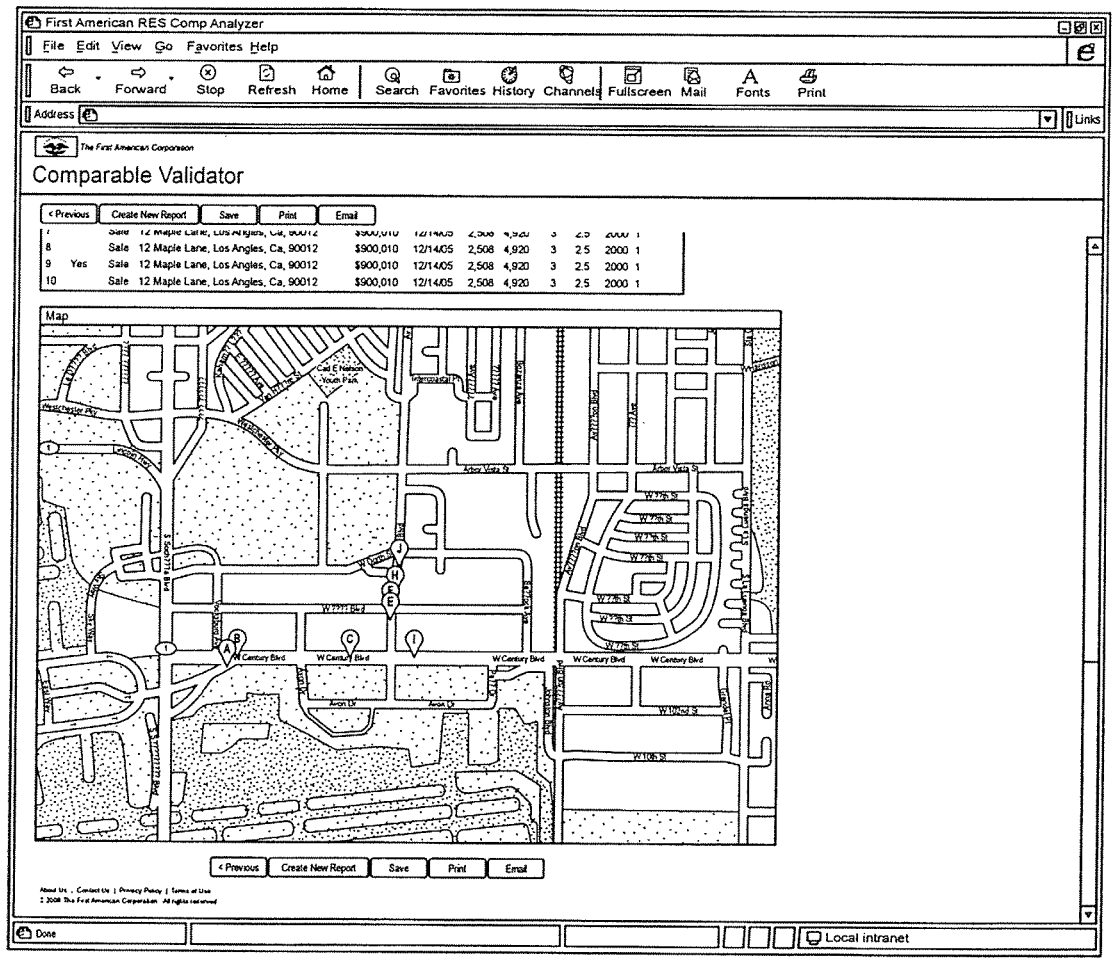
FIG. 12 is a map of the results identifying the subject property, the comparables from the appraiser, and the comparables from the validation and scoring module according to an embodiment of the invention.
Figure 13:
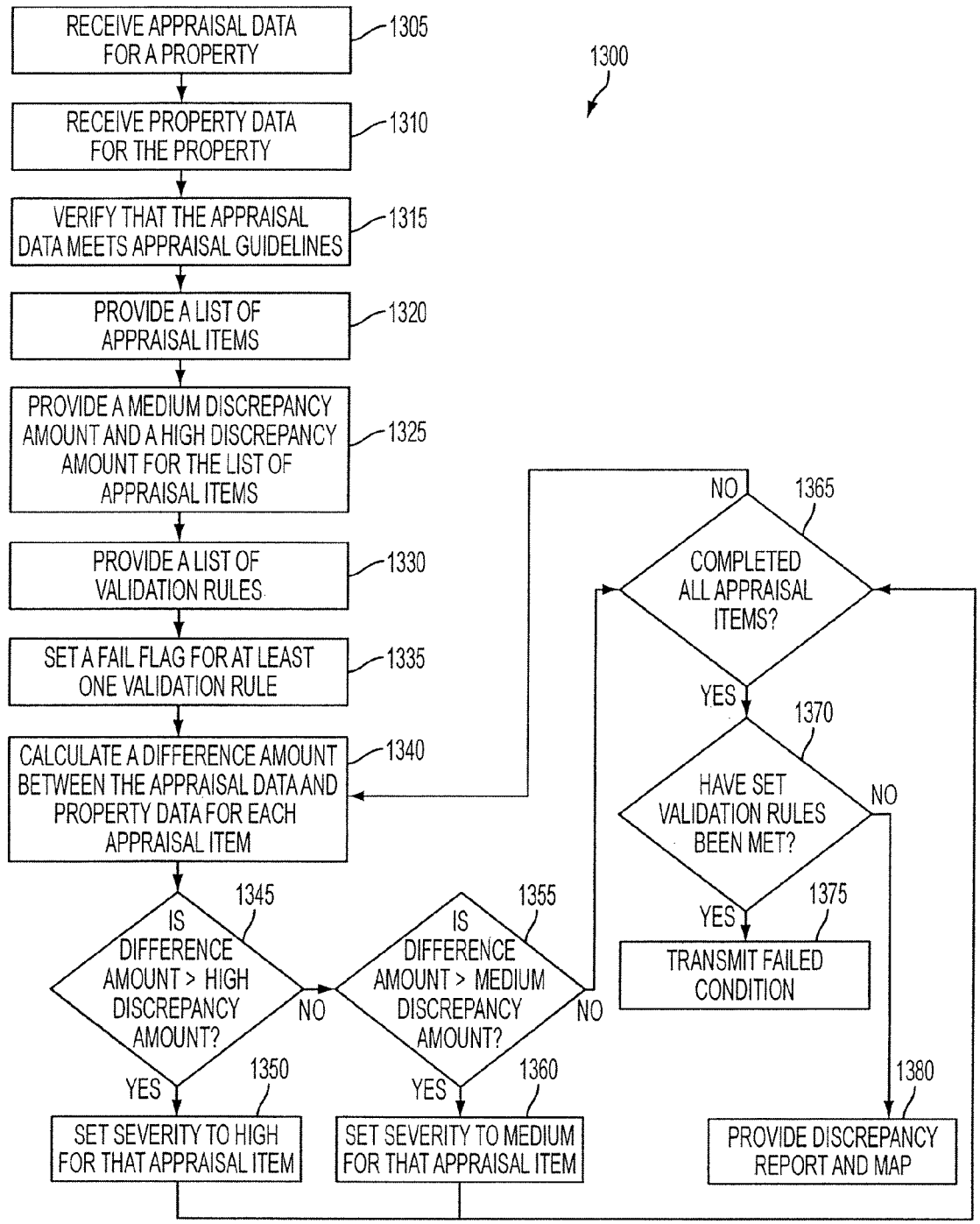
FIG. 13 is a flow chart of a method of validating an appraisal report according to an embodiment of the invention.

FIG. 12 is a map of the results identifying the subject property, the comparables from the appraiser, and the comparables from the validation and scoring module according to an embodiment of the invention.

What is claimed is:

1. A non-transitory machine-readable medium for validating appraisal input data entered into an appraisal report that includes a valuation appraisal comprising computer-readable instructions that when executed by a processor cause the processor to:

receive the appraisal input data for a property, said appraisal input data being provided through an interface by an appraiser and said appraisal input data comprising a selection of one or more comparables associated with said property;

receive through the interface property data for the property from a public records database;

identify a list of appraisal items that are present in the appraisal input data and that form a basis on which the valuation appraisal is performed;

setting a user-established discrepancy threshold;

calculate with the processor a difference amount between the appraisal input data and the property data for each appraisal item to validate the appraisal input data with the data for the property from the public records database;

determine whether the difference amount exceeds the user-established discrepancy threshold;

determine a distance between each of the one or more selected comparables and the property;

determine whether the distance between each of the one or more comparables and the property falls within a proper guideline for the one or more comparables to be considered a comparable property;

identify one or more other comparables from the public record database that are more comparable to the subject property than the one or more comparables based at least in part on a sale price, a sale date, a gross living area, a year built, a lot size, a number of bedrooms, or a number of bathrooms associated with the one or more other comparables; and generate a discrepancy message that reports a discrepancy when the difference amount exceeds the user-established discrepancy threshold so as to alert of a potential fraudulent appraisal, and that includes the one or more other comparables.

2. The machine-readable medium of claim 1 wherein the appraisal input data is selected from a group consisting of an address, a sale price, a sale date, a location, a type of leasehold, a lot size, a home size, a view, a design and appeal, a quality of construction, an age or year built, a condition, a bedroom count, a bathroom count, a roof type, a functional utility, a heating/cooling type, energy efficient items, a number of garages, an amenities list of the property, and combinations thereof.

3. The machine-readable medium of claim 1 wherein the property data is selected from a group consisting of an address, a sale price, a sale date, a location, a type of leasehold, a lot size, a home size, a view, a design and appeal, a quality of construction, an age or year built, a condition, a bedroom count, a bathroom count, a roof type, a functional utility, a heating/cooling type, energy efficient items, a number of garages, an amenities list of the property, and combinations thereof.

4. The machine-readable medium of claim 1 further comprising instructions that upon execution cause a machine to set a high severity indicator if the difference amount is greater than the high discrepancy amount.

5. The machine-readable medium of claim 4 further comprising instructions that upon execution cause the machine to set a medium severity indicator if the difference amount is greater than the medium discrepancy amount.

6. The machine-readable medium of claim 5 further comprising instructions that upon execution cause the machine to provide a list of validation rules.

7. The machine-readable medium of claim 6 further comprising instructions that upon execution cause the machine to receive a set fail flag for at least one of the validation rules.

8. The machine-readable medium of claim 7 further comprising instructions that upon execution cause the machine to use the appraisal input data to determine whether the validation rule with the set fail flag is satisfied.

9. The machine-readable medium of claim 8 further comprising instructions that upon execution cause the machine to use the high severity indicator to determine whether the validation rule with the set fail flag is satisfied.

10. The machine-readable medium of claim 8 further comprising instructions that upon execution cause the machine to use the medium severity indicator to determine whether the validation rule with the set fail flag is satisfied.

11. The machine-readable medium of claim 1 further comprising instructions that upon execution cause the machine to provide the one or more comparables and the property on a graphical map.

12. The machine-readable medium of claim 1 further comprising instructions that upon execution cause the machine to provide the one or more comparables, the one or more other comparables, and the discrepancy message as a graphical output.

13. The machine-readable medium of claim 1 further comprising instructions that upon execution cause the machine to calculate an appraisal score for the appraiser based at least in part on the calculated difference amount between the appraisal input data and the property data for each appraisal item.

14. The machine-readable medium of claim 13, wherein a lower appraisal score is representative of a higher calculated difference amount between the appraisal input data and the property data for each appraisal item.

15. A non-transitory machine-readable medium for validating appraisal input data entered into an appraisal report that includes a valuation appraisal comprising computer-readable instructions that when executed by a processor cause the processor to:

receive the appraisal input data for a property, said appraisal input data being provided through an interface by an appraiser and said appraisal input data comprising a selection of one or more comparables associated with said property;

receive through the interface property data for the property from a public records database;

identify a list of appraisal items that are present in the appraisal input data and that form a basis on which the valuation appraisal is performed;

setting a user-established discrepancy threshold;

calculate with the processor a difference amount between the appraisal input data and the property data for each appraisal item to validate the appraisal input data with the data for the property from the public records database;

determine whether the difference amount exceeds the user-established discrepancy threshold;

determine a distance between each of the one or more comparables and the property;

determine whether the distance between each of the one or more comparables and the property falls within a proper guideline for the one or more comparables to be considered a comparable property;

identify one or more other comparables from the public record database that are more comparable to the subject property than the one or more comparables; and generate a notification that the valuation appraisal has failed when the difference amount exceeds the user-established discrepancy threshold so as to alert of a potential fraudulent appraisal.

* * * * *